United States Patent
Zou et al.

(10) Patent No.: US 6,700,694 B2
(45) Date of Patent: Mar. 2, 2004

(54) FERRO-ELECTRIC AZIMUTH ROTATOR

(75) Inventors: Yingyin Zou, Burlington, MA (US); Feiling Wang, Medford, MA (US); Jingwen Zhang, Acton, MA (US)

(73) Assignee: Corning Applied Technologies Corporation, Woburn, MA (US)

( * ) Notice: Subject to any disclaimer, the term of this patent is extended or adjusted under 35 U.S.C. 154(b) by 0 days.

(21) Appl. No.: 10/164,866

(22) Filed: Aug. 14, 2002

(65) Prior Publication Data

US 2003/0002131 A1 Jan. 2, 2003

Related U.S. Application Data

(63) Continuation-in-part of application No. 09/848,766, filed on May 4, 2001, now Pat. No. 6,522,456, and a continuation-in-part of application No. 09/695,538, filed on Oct. 24, 2000, now Pat. No. 6,404,538, and a continuation-in-part of application No. 09/519,293, filed on Mar. 6, 2000, now Pat. No. 6,404,537.

(51) Int. Cl.$^7$ .............................. G02F 1/09; G02F 1/035
(52) U.S. Cl. .................... 359/281; 359/282; 359/245; 359/250; 359/322; 359/323; 385/2; 385/8
(58) Field of Search ................. 359/281, 282, 359/322, 324, 484, 246, 250, 251, 483, 497, 323, 245, 252; 324/96, 244.1; 385/2, 8; 372/26, 27

(56) References Cited

U.S. PATENT DOCUMENTS

| | | | |
|---|---|---|---|
| 4,733,938 A | 3/1988 | Lefevre et al. | 350/96 |
| 5,469,279 A * | 11/1995 | Sharp et al. | 349/74 |
| 5,473,465 A * | 12/1995 | Ye | 359/246 |
| 5,804,907 A * | 9/1998 | Park et al. | 310/358 |
| 6,028,656 A * | 2/2000 | Buhrer et al. | 349/196 |
| 6,137,619 A * | 10/2000 | Chen et al. | 359/251 |
| 6,437,904 B1 * | 8/2002 | Reeder | 359/322 |

FOREIGN PATENT DOCUMENTS

| | | |
|---|---|---|
| WO | WO 01/23912 A2 | 4/2001 |
| WO | WO 01/40849 A2 | 6/2001 |
| WO | WO 01/51981 A1 | 7/2001 |

OTHER PUBLICATIONS

"Electrically controllable azimuth optical rotator" Zhuang, et al, Applied Physics Letters, vol. 76, No. 17, Apr. 24, 2000.

* cited by examiner

*Primary Examiner*—Hung Xuan Dang
*Assistant Examiner*—Tuyen Tra
(74) *Attorney, Agent, or Firm*—Juliana Agon

(57) ABSTRACT

An electrically controllable azimuth optical rotator (10) includes a first quarterwave plate (16) for receiving a first beam of electromagnetic energy (22) having a first arbitrary polarization state, and outputting a second beam (122) in response to the first quarterwave plate (16). An electric voltage controlled ferro-electric variable phase retarder (20) aligned at approximately 45 degrees to the first quarterwave plate (16) receives the second beam 122 and provides a third beam 38 in response to the retarder (20). The electric voltage controlled ferro-electric variable phase retarder (20) is characterized by a phase shift of $\phi=2\alpha$, where $\alpha$ is a desired angle of rotation of the first arbitrary polarization state. To provide a voltage-controlled rotation, a second quarterwave plate (18) is aligned either parallel or perpendicular to the first quarterwave plate (16) for receiving the third beam (38) and outputting a fourth beam (46) in response to the retarder (20). As a result, the fourth beam (46) has a polarization state similar to the first arbitrary polarization state but rotated by $\alpha$.

20 Claims, 5 Drawing Sheets

FERRO-ELECTRIC AZIMUTH ROTATOR

CROSS-REFERENCE TO RELATED APPLICATIONS

This is a continuation-in-part of U.S. patent application Ser. No. 09/848,766 filed on U.S. parent application Filing Date May. 4, 2001 now U.S. Pat. No. 6,522,456, the content of which is relied upon and incorporated herein by reference in its entirety, and the benefit of priority under 35 U.S.C. §120 is hereby claimed.

This is also a continuation-in-part of U.S. patent application Ser. No. 09/519,293 filed on U.S. parent application Filing Date Mar. 6, 2000 now U.S. Pat. No. 6,404,837, the content of which is relied upon and incorporated herein by reference in its entirety, and the benefit of priority under 35 U.S.C. §120 is hereby claimed.

This is also a continuation-in-part of U.S. patent application Ser. No. 09/695,538 filed on U.S. patent application Filing Date Oct. 24, 2000 now U.S. Pat. No. 6,404,538, the content of which is relied upon and incorporated herein by reference in its entirety, and the benefit of priority under 35 U.S.C. §120 is hereby claimed.

BACKGROUND OF THE INVENTION

1. Field Of The Invention

The present invention relates generally to optical polarization transformation, and particularly to optical polarization rotators, and most particularly to electrically tunable azimuth optical rotators for rotating the polarization state of polarized light beam.

2. Technical Background

Transformation of the state of polarization (SoP) of light beams is important in many applications. Polarization transformer converts the SoP of an input light beam to a predetermined output SoP. Polarization transformers can convert any input SoP to any output SoP, which means a linearly polarized light could be converted to an elliptical one. A polarization rotator is a narrower type of a polarization transformer in that the rotator can only rotate the polarization direction. Polarization rotators, such as azimuth rotators are known, in which the rotation of the SoP on the Poincare sphere (PS) is about an axis that intercepts with the north and the south poles. This known azimuth rotator will preserve the polarization property of the light beam while rotating the polarization. Hence, a linearly polarized beam will be still linearly polarized after the rotation. For example, the circularly or elliptically polarized light will each retain their original respective polarizations.

Rotators are basic elements that are employed in a variety of fiber optic devices. The simplest way to do this is with a birefringent half-wave plate to rotate the input light beam by a predetermined angle. The limitation of this approach is that the rotation angle is preset and not changeable. There are demands on tunable azimuth rotators in various applications including dynamic gain flattening filters (DGFF), polarization mode dispersion (PMD) emulators, PMD compensators that include a variable digital group delay (VDGD) line, and other optical telecommunication applications. Such applications often require cost-effective space-efficient high-speed low-loss tunable rotators that can efficiently rotate the arbitrary polarization state of a light beam by any demanding angle.

There are several known approaches that can achieve the azimuth rotation. Known azimuth rotators include different types made from liquid crystal, electro-optical (E-O) materials, magneto-optical materials, and mechanical movement of birefringent fibers. However, these known approaches do not have the high-speed response, low insertion loss or small size required of advance optical components and systems. For example, a magneto-optical based rotator requires a magnetic field, so it is inconvenient in most applications and difficult to integrate into optical systems. A liquid crystal based rotator tends to be slow in response. Mechanical movements may cause various kinds of errors and is also slow in response. The electro-optical rotators, mostly based on $LiNbO_3$ waveguide, are high in optical insertion loss.

Hence, a need exists in the art for a cost-effective space-efficient high-speed tunable rotator that can perform an azimuth rotation on an arbitrary polarized light beam.

SUMMARY OF THE INVENTION

One aspect of the invention is the use of an electric voltage controlled ferro-electric variable phase retarder to form an electrically controllable azimuth optical rotator.

In another aspect, the present invention includes the ferro-electric materials, such as PLZT, PMN-PT, and PZN-PT to form the electric voltage controlled ferro-electric variable phase retarder.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1A:
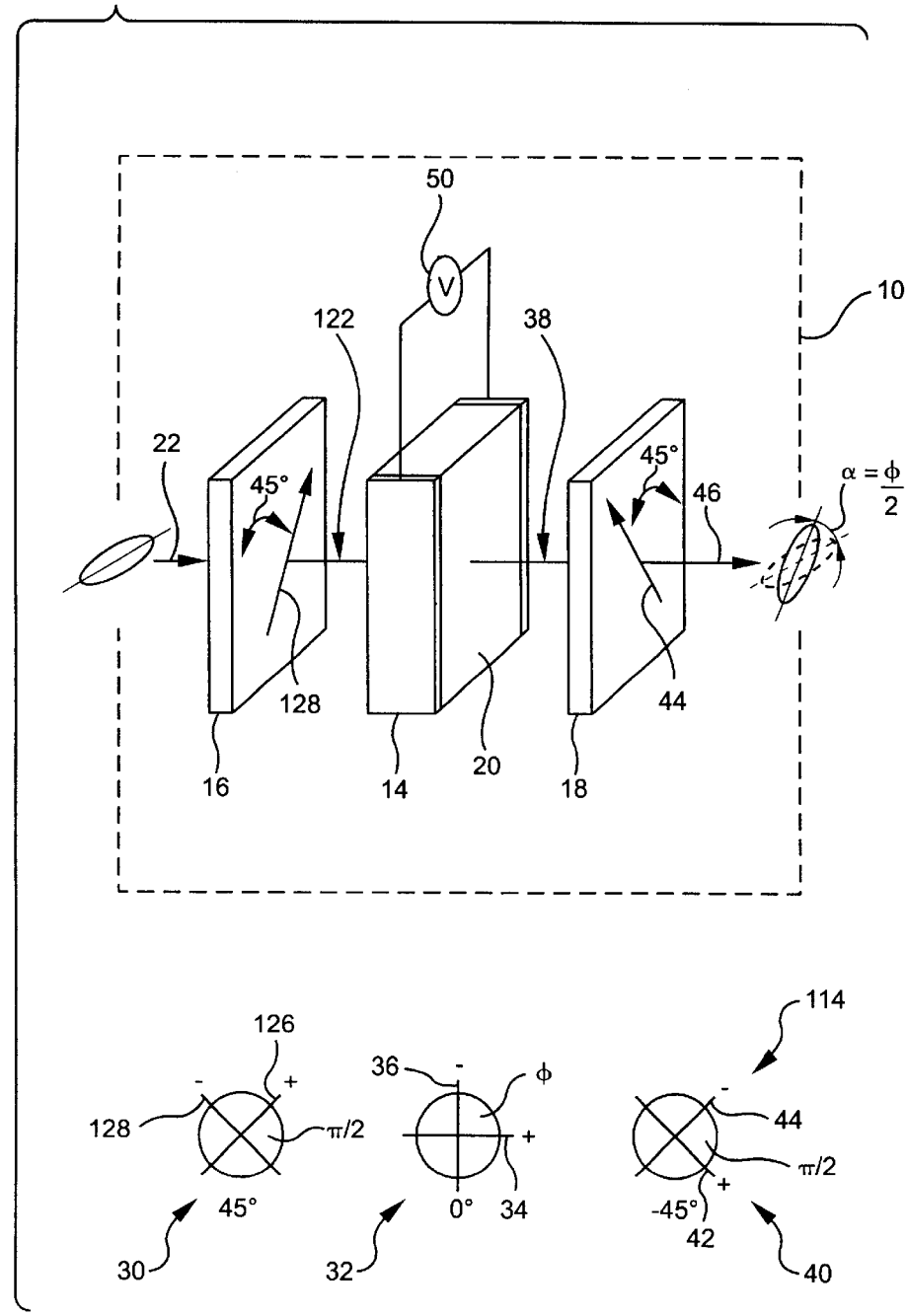
FIGS. 1A–B is a view of one embodiment of a rotator 10 of the present invention showing a phase retarder sandwiched in between two orthogonal quarter-wave plates and corresponding plots depicting the principal axis of the waveplates.

Referring to FIGS. 1A–B and 2A–B, an electrically tunable azimuth optical rotator 10 includes a first quarter-wave plate 16 for receiving a first light beam 22 having a first arbitrary polarization state, and outputting a second beam 122 in response to the first quarterwave plate 16. Generally, an arbitrary polarization state is decomposable into a linear combination of left and right circular polarization states. The first quarter wave plate 16 will convert these two circular polarization states to two orthogonal linear polarization states that are parallel to the horizontal axis 34 and vertical axis 36, respectively.

An electric voltage controlled ferro-electric variable phase retarder 20 is aligned at approximately 45 degrees to the first quarterwave plate 16 for receiving the second beam 122 and providing a third beam 38 in response to the retarder 20. The electric voltage controlled ferro-electric variable phase retarder 20 is characterized by a phase shift of $\phi=2\alpha$, where $\alpha$ is a desired angle of rotation of the first arbitrary polarization state as the final rotation angle. The ferro-electric retarder 20 has electrodes 14 across which a voltage is applied to introduce the relative phase retardation or phase shift $\phi$ to the two orthogonal linear polarization states.

Figure 1B:
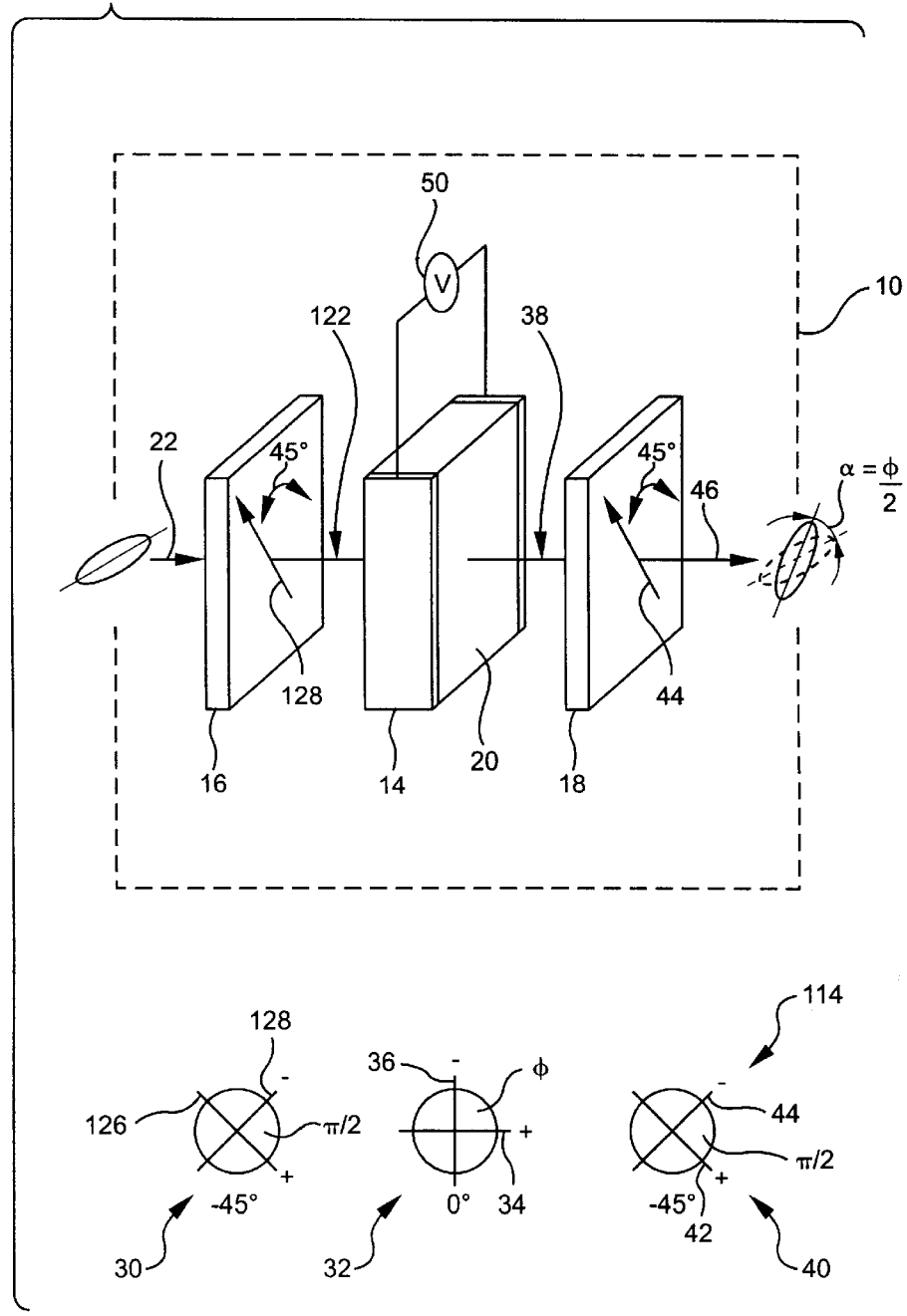
Figure 2A:
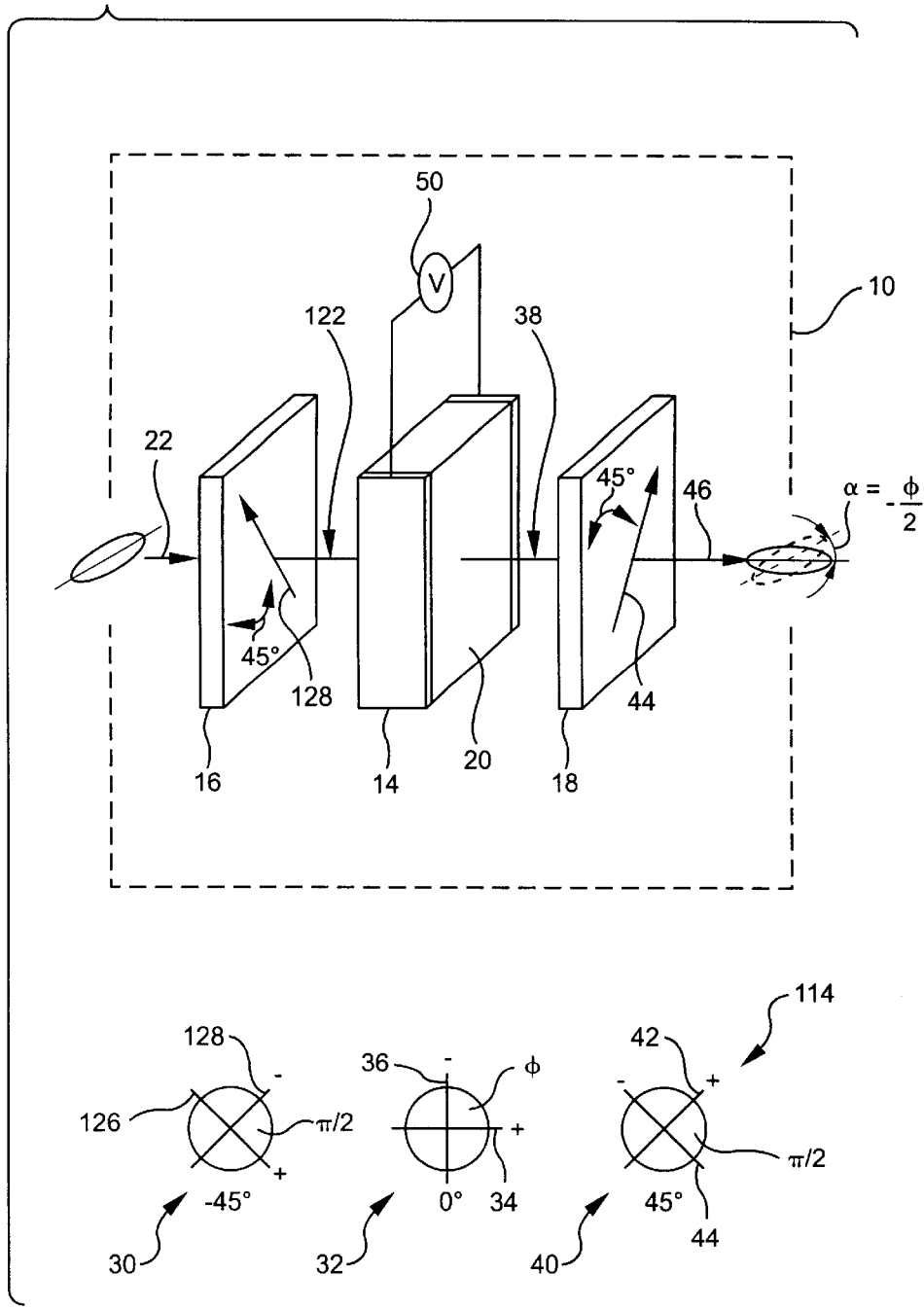
FIGS. 2A–B is a view of a second embodiment of the rotator 10 of the present invention showing a phase retarder sandwiched in between two parallel quarter-wave plates and corresponding plots depicting the principal axis of the waveplates.
Figure 2B:
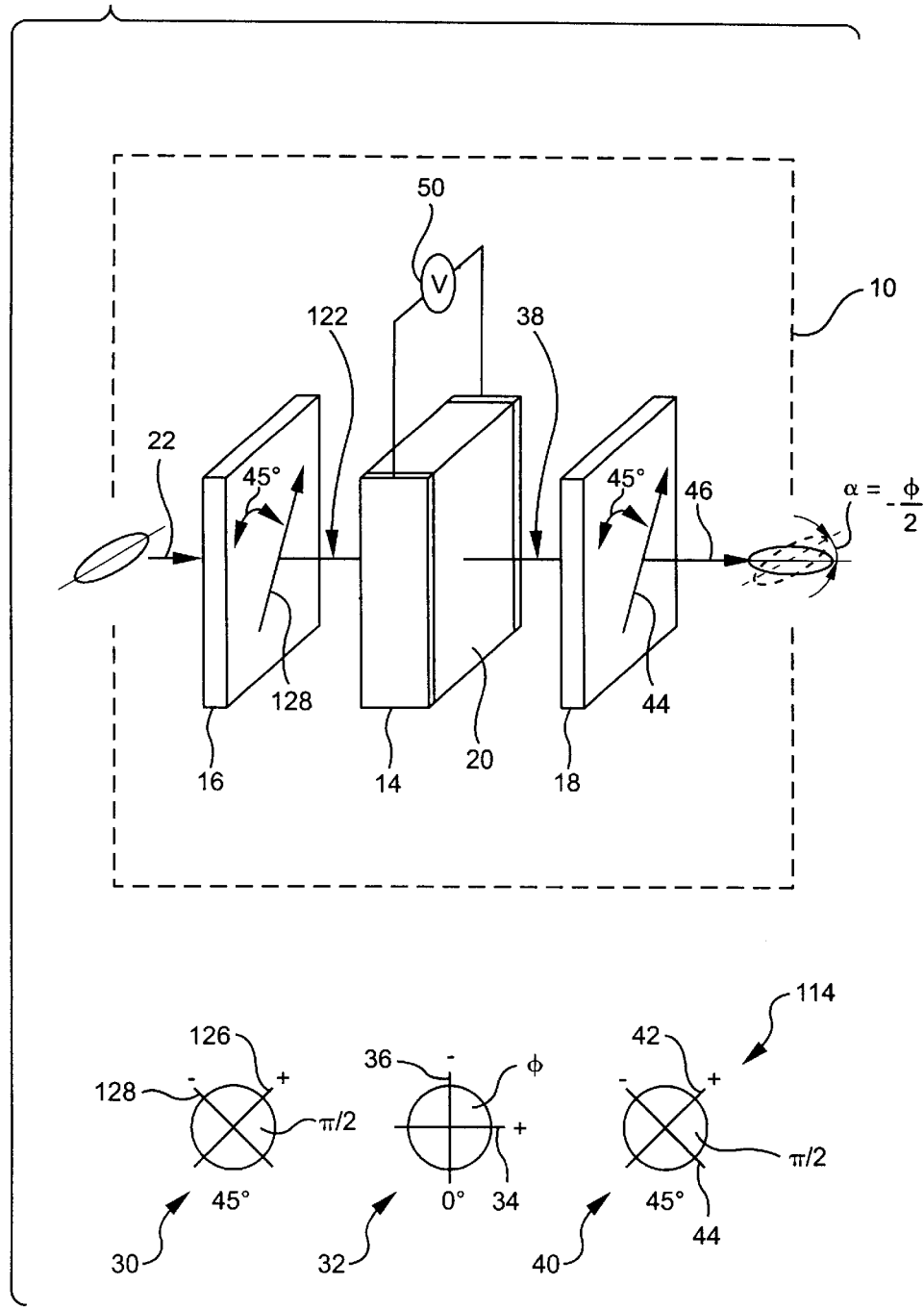

A second quarterwave plate 18 is aligned either parallel, in FIGS. 1B and 2B, or perpendicular, in FIGS. 1A and 2B, to the first quarterwave plate, 16, for receiving the third beam 38 and outputting a fourth beam 46 in response to the second quarterwave plate 18. The second quarterwave plate converts the resulting linear polarization states back into their original circular states but angled by $\alpha$, which results in a fourth beam 46 with the same polarization state with a rotated angle $\alpha$.

Typically, quaterwave plates 16, 18 are fabricated from birefringent crystal materials, such as Quartz, Sapphire, $YVO_4$, $TiO_2$, or other suitable birefringent materials.

Figure 3:
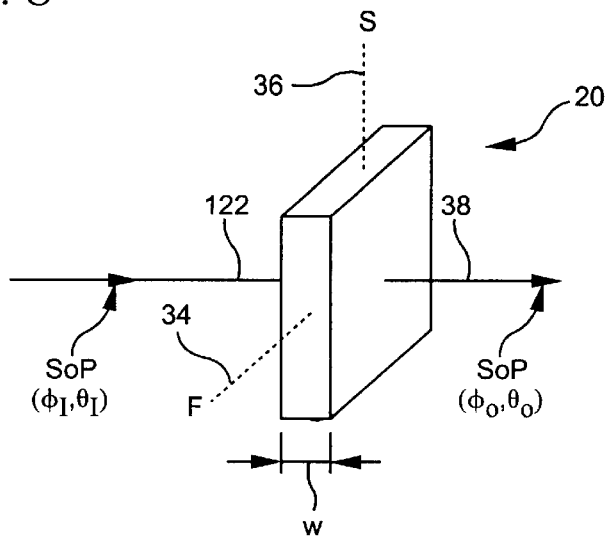
FIG. 3 is a schematic diagram illustrating an embodiment of the retarder 20 of FIG. 1, in accordance with the present invention.

An embodiment of the variable phase retarder 20 of FIGS. 1–2 operating just as a polarization transformer is shown in FIG. 3. A light beam 122 travels from left to right in this illustration and passes through the phase retarder 20. In general, the polarization state of a light beam 122 can be defined by two parameters, $\theta$ and $\phi$, where $\theta$ defines the relative magnitudes of orthogonal components and $\phi$ defines their relative phase. The operation of the retarder 20 is such that input light beam 122 having a constant state of polarization SoP ($\theta_I$, $\phi_I$) is incident on the phase retarder. The output light beam 38 is shown having an output SoP ($\theta_O$, $\phi_O$). With a voltage applied to electrodes of the phase retarder (described further herein), those components that are polarized along the slow (S) 36 and fast (F) 34 axes, as described below, are retarded in optical phase by different amounts as they travel through the plate's thickness W. The effects may be visualized as rotating the polarization direction of the beam. When a half-wave voltage $V_\pi$ an is applied, the component polarized along the fast axis becomes 180 out of phase with the component polarized along the slow axis so that its direction is reversed. Thus, the phase retarder 20 operates to transform a constant input SoP to an output SoP that is tunable over a range of at least 180 degrees.

There are a number of materials and mechanisms that can be used to provide a retarder which will be discussed in more detail below. Its operation in the embodiment illustrated in FIG. 3 can be explained by assuming an ideal material which, with no voltage applied, has equal indices of refraction for all polarization directions (i.e., isotropic). When a voltage is applied, the applied electric field induces a change in index of refraction (also known as field-induced birefringence) along two principal axes referred to as the fast and slow axes, which can all be interchanged. The radiation components polarized along the fast and slow axes travel with refractive indices $n_F$ and $n_S$, respectively. The induced birefringence thus causes a relative phase shift in the components. If the plate has a thickness W, the accumulated phase shift or difference is given by $\phi=2\pi(n_F-n_S)W/\lambda$. By adjusting W, $\phi$ can be made to be $\pi$ radians=180°. This means that after traversing the retarder plate, the electric field of one polarization component has the opposite sign relative to the other compared to when they entered the plate. For example, if the incoming polarization direction with respect to the optical axis is $\beta$, the outgoing direction is then 180°-$\beta$ for ($n_F-n_S$) positive.

The general requirement for the retarder plate is that, when a voltage is applied, a phase shift is $\phi$ produced between differing polarization directions. Preferably, the material has a high electro-optic coefficient in order to reduce operating voltages to less than 400 volts. Preferably, the mechanical characteristics allow formation of a bar or plate. Further, the material must be transparent at the wavelength of interest, e.g., between 1200 nm and 1600 nm.

A number of electro-optic materials are available, but many require on the order of kilovolts to obtain an appreciable phase change. These requirements are satisfied by a class of ferroelectric complex oxides which 1) are optically isotropic; 2) have a Curie temperature less than about 490° C., so that electro-optic coefficients are high near room temperature; 3) have a diffusive phase transition, so that the temperature dependence of the electro-optic coefficients is lessened; and 4) which are not permanently poled by moderate electric fields since materials with a low Curie temperature that become permanently poled are less stable. Example material systems include lead zirconate titanate (PZT), lanthanum modified PZT (PLZT), lead manganese niobate (PMN), a solid solution of lead zinc niobate and lead tantalate (PZN-PT), and a solid solution of lead manganese niobate and lead tantalate (PMN-PT). Besides PLZT and PZT, without being an exhaustive list the following materials may be used: $Pb(Zr,Ti)O_3$, $Pb(Mg,Nb)O_3$, and a solid solution of $Pb(Mg,Nb)O_3$ and $PbTaO_3$.

In general, for any material with an optical path length, W, index of refraction, n, and an applied voltage producing an electric field, $\xi$, one can write the optical path difference between two polarization:

$$\Delta L = n\Delta W + W\Delta = nW[d\xi + \gamma\xi^2 - 0.5n^3(r\xi + R\xi^2)]$$

The four terms on the right represent the piezoelectric, electrostrictive, linear electro-optic (Pockell) and quadratic electro-optic (Kerr) effects with coefficients, d, $\gamma$, r, and R, respectively. All materials exhibit the effects which depend quadratically on $\xi$ to a greater or lesser extent. There also exist 20 classes of piezoelectric crystals with no center of symmetry that also exhibit the two effects which depend linearly on $\xi$. In many devices, the range of phase retardation $\phi$ required is from 0 to $\pi$ radians. At $\pi$ radians, $\Delta L$ has changed by half a wavelength. Materials are often characterized by the voltage required to effect such a half wavelength change, the half-wave voltage, $V_\pi$.

According to the present invention, the preferred electro-optic material is in a form of ceramics that Corning calls OptoCeramic™ for the ferro-electric E-O material to provide the compact size, fast response and low loss not as readily available from the crystals of liquid crystals.

PLZT with a nominal 9.5/65/35 La/Pb/Zr composition is a preferred OptoCeramic™ material. This composition is known to be transparent in a range from 450 nm to 7 $\mu$m; see, for example, Lionel M. Levinson, Electronic Ceramics, Chapter 7 (Marcel Dekker, New York, 1987). It is commercially available as hot pressed ceramic plates from Aura Ceramics (New Hope, Minn.). In the form of hot-pressed ceramics, it is optically isotropic and exhibits little birefringence with zero applied voltage. The electro-optic coefficient is high and the effect is approximately quadratic with voltage. PLZT does not exhibit large linear effects (d=r=0) but has high quadratic coefficients, γ and R. For reference purposes nominal values for PLZT with a 9/65/35 La/Pb/Zr composition are n=2.45 and R=2.53×10$^{-16}$ m/V$^2$ at 0.88 μm and n=2.3 and R=2.4×10$^{-16}$ m/V$^2$ at 1.55 μm PLZT has a polycrystalline structure with crystal sizes ranging from about 5 to 20 microns. The required electric fields are considerably higher than for liquid crystal-based devices, but the response time is much shorter.

Another preferred OptoCeramic™ material, PMN-PT, for use in the present invention may be described by the general formula $$Pb_{1-z}La_z[(Mg_tNb_{1-t})_xTi_{1-x}]_{1-z/4}O_{3+x/2-3xt/2-xz/8+3xtz/8}$$

wherein x is between about 0.6 and about 0.95, z is between about 0 and about 0.08, and t is between about 0.30 and about 0.36. In especially preferred electro-optic ceramic materials of the present invention, z is between about 0.01 and about 0.06. In preferred electro-optic materials of the present invention, t may be between about 0.32 and about 0.34, and x may be between about 0.65 and about 0.90.

Yet another preferred OptoCeramic™ material, PZN-PT, for use in the present invention may be described by the general formula $$Pb_{1-y-z}Ba_yLa_z[(Zn_tNB_{1-t})_xTi_{1-x}]_{1-z/4}O_{3+x/2-3xt/2-xz/8+3xtz/8}$$

wherein x is between about 0.5 and about 0.9, y is between about 0.05 and about 0.5, z is between about 0 and about 0.05, and t is between about 0.30 and about 0.36. In especially preferred electro-optic ceramic materials of the present invention, x is between about 0.65 and about 0.85, y is between about 0.1 and about 0.2, z is between about 0.02 and 0.04, and t is between about 0.32 and about 0.34.

EXAMPLE 1

An electro-optic ceramic material having the formula $$Pb_{0.96}La_{0.04}[(Mg_{1/3}Nb_{2/3})_{0.75}Ti_{0.25}]_{0.99}O_3$$

was prepared using the columbite precursor—mixed oxide method as follows:

Lead (II) oxide, lanthanum oxide, magnesium carbonate, niobium (V) oxide, and titanium (IV) oxide powders were used as starting materials. The magnesium carbonate and niobium (V) oxide powders (119.7 g total) were combined in amounts corresponding to the stoichiometry of the desired ceramic, and mixed with 175 mL water to form a slurry. The slurry was ball milled using 750 g alumina cylinders in a 1000 mL jar for about 30 minutes, dried at 90° C., and fired at 1000° C. for about 8 hours. The resulting solid was mixed with the stoichiometrically desired amounts of lead (II) oxide (345.7 g), lanthanum oxide (10.5 g), and titanium (IV) oxide (31.2 g), along with 400 mL water. A slight excess (about 2 wt %) of lead (II) oxide was added to counteract the effects of evaporation of lead during processing. The resulting slurry was ball milled for about 30 minutes in a 2000 mL jar with 1500 g alumina cylinders, dried at 90° C. to completely remove the water, then fired at 800° C. for 4 hours. The fired powder was then ball milled with 400 mL organic solvent (e.g. trichloroethylene or acetone) in a 2000 mL plastic jar with 1500 g alumina cylinders. A one hour post annealing may be used to remove the residual organic left in the powder. An opaque cylindrical powder preform (5.1 cm long, 3.2 cm diameter) was formed by pressing the resulting powder in a stainless steel mold at a cold pressure of 140 kgf/cm$^2$ (about 2000 psi, or about 13.79 MPa).

EXAMPLE 2

An electro-optic ceramic material having the formula $$Pb_{0.83}Ba_{0.15}La_{0.02}[(Zn_{1/3}Nb_{2/3})_{0.7}Ti_{0.3}]_{0.995}O_3$$

was prepared using the columbite precursor—mixed oxide method as follows:

Lead (II) oxide, barium carbonate, lanthanum oxide, zinc oxide, niobium (V) oxide, and titanium (IV) oxide powders were used as starting materials. The zinc oxide and niobium (V) oxide powders (76.5 g total) were combined in amounts corresponding to the stoichiometry of the desired ceramic, and mixed with 175 mL water to form a slurry. The slurry was ball milled using 750 g alumina cylinders in a 1000 mL jar for about 30 minutes, dried at 90° C., and fired at 1000° C. for about 4 hours. The resulting solid was mixed with the stoichiometrically desired amounts of lead (II) oxide (179.9 g), barium carbonate (27.5 g), lanthanum oxide (3.1 g), and titanium (IV) oxide (22.6 g). A slight excess (about 2 wt %) of lead (II) oxide was added to counteract the effects of evaporation of lead during processing. The combined powders were mixed by ball milling for 30 minutes in a 2000 mL jar with 300 mL water and 1500 g alumina cylinders. The resulting slurry was dried at 90° C., and calcined in an alumina crucible at 900° C. for four hours. The resulting calcined powder was ball milled for 16 hours in a polyethylene jar with 300 mL trichloroethylene or acetone using alumina cylinders (1500 g) as grinding media. The resulting slurry was dried at 85° C. A one hour post annealing step at 700° C. may be used to remove the organic residual left in the powder. More members of this ferro-electric or opto-ceramic class may be discovered in the future.

Figure 4:
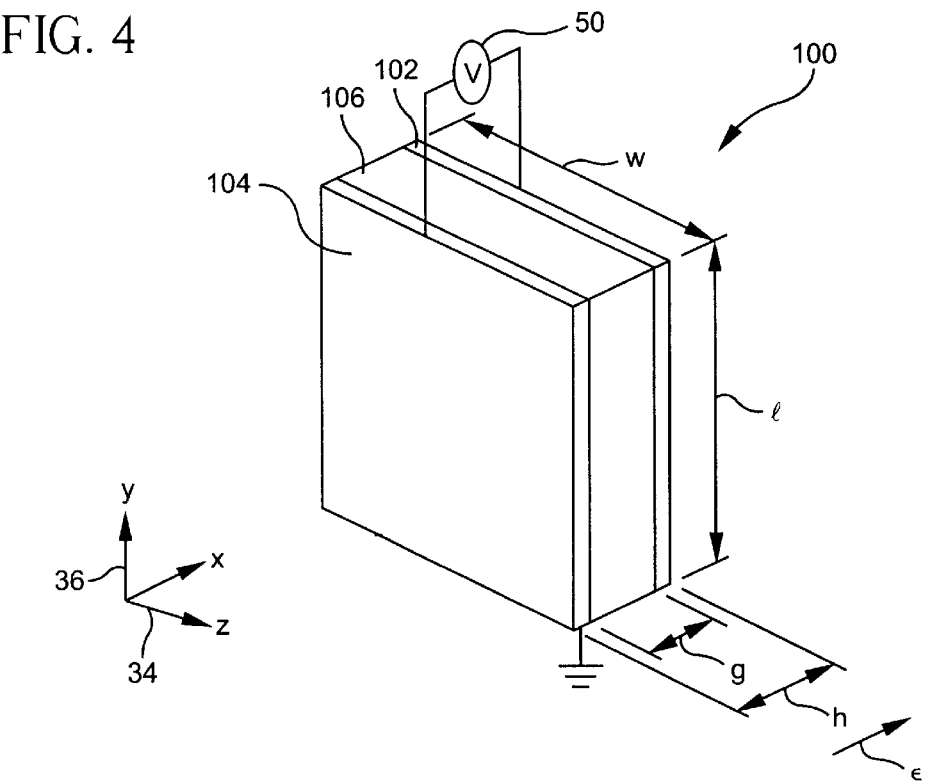
FIG. 4 is a perspective view illustrating an embodiment of the retarder 20 of FIG. 3 for use in the rotator 10 of FIG. 1, in accordance with the present invention.

An electrode geometry which takes advantage of these materials is illustrated by the transverse field configuration illustrated in FIG. 4 where the electrodes 14 of FIGS. 1–2 are illustrated as a pair of metallized electrodes 102 and 104. A plate 100, for use as the phase retarder 20 of FIGS. 1–2, is shown which has thin metallized electrodes 102, 104 on the both sides, respectively, of a block section 106 of E-O material. The electrodes 102 and 104 are shown connected to a control voltage V. The electric field (designated E) is 90° to the direction of radiation propagation (x-axis). Since the effect is based on the electric field in the material, it is desirable to arrange the electrodes as close together as possible to minimize the control voltage.

The preferred metal electrode structure for the electrodes 102 and 104 is a composition of gold, titanium, and nickel (Au/Ti/Ni) for applying an electric field of the electric voltage controlled ferro-electric variable phase retarder that is perpendicular to the second beam 122.

The PLZT plate with metallized electrodes has dimensions where the height (h) which includes the thickness of the electrodes and the gap (g) between the electrodes is about 430 μm, a width (w) of about 1.44 mm, and a length (l) of about 1.7–2.9 mm. Such a dimensioned PLZT plate has an insertion loss of about 0.1 dB. It will be understood that the particular geometry described is an example and that other device geometries can be used. Different dimensions of g and W can be selected to provide different phase retardation value.

Functionally, the electrode pair 14 is provided on the retarder 20 of the resultant optical polarization or electrically controllable azimuth optical rotator 10 to adjust the phase retardation φ between components of the optical input 122. Hence, parallel electrodes 14 are disposed on retarder 20, in FIGS. 1–2, and a voltage such as a DC voltage can be applied across electrode pairs 14 via a voltage source 50, so that a uniform electric field E is produced to adjust the phase retardation φ.

Hence, the electric voltage controlled ferro-electric variable phase retarder 20 is preferably a plate of transparent polycrystalline PLZT material of a width about 1.44 mm, the plate having an optical axis oriented perpendicular to a propagation direction of light beam at a wavelength between 1200 nm and 1600 nm incident upon the plate that has a first polarization state, the plate having electrodes for applying an adjustable electric field between 0 volts and 400 volts across a plane of the plate perpendicular to the propagation direction to provide the phase retardation between 0 and 27π.

The quadratic E-O effects of the PLZT retarder 20 in the azimuth rotator 10 configuration provide either positive or negative rotation, which is sufficient for typical applications which requires an azimuth rotation of the polarization. Instead of reaching both positive and negative rotations by changing the polarity of applied voltage on linear liquid crystal EO rotators, positive and negative voltages provides the same rotation direction in quadratic PLZT-based rotators. Hence, the principle axes of the ferro-electric rotator 10 have to be aligned in different configurations to have separate positive and negative rotation.

Referring to FIG. 1A, a positive rotator 10 with a desired angle of rotation +α is shown. The first and second quarterwave plates 16 and 18 are aligned +45° and −45° with respect to a horizontal line (not shown). The PLZT variable phase retarder 20 is sandwiched in between with. The principle axes 114 of quarterwave plates and phase retarder are shown as well, where the plus sign (+) designates the fast (F) axis and the negative sign (−) designates the slow (S) axis. The phase difference between the fast axis 126 and slow axis 128 of first quarterwave plate 16 is $$\frac{\pi}{2}.$$

The variable phase retardation φ will be generated by an applied voltage across the electrodes 14 between the fast axis 34 and slow axis 36 on a phase retarder 20. The phase difference between the fast axis 42 and slow axis 44 of second quarterwave plate 18 is $$\frac{\pi}{2}.$$

The operation of the tunable azimuth rotator 10 may be described via Jones matrices. The arbitrary polarized incident light field 22 is represented by $$E^i = \begin{pmatrix} E^i_x \\ E^i_y \end{pmatrix}. \quad \text{Equation (1)}$$

with the x axis along the horizontal line (not shown).

The output light field 46, $E^o$, passing through an optic system, such as the tunable rotator 10 described by Jones matrix J, can be described by the following equation:

$$E^o = JE^i, \quad \text{Equation (2)}$$

where the product $JE^i$ is implemented in accordance with matrix multiplication rules.

The Jones matrix of the rotator 10 can then be expressed as $$J = R(45°)Q\left(\frac{\pi}{2}\right)R(-45°)W(\phi)R(-45°)Q\left(\frac{\pi}{2}\right)R(45°) \quad \text{Equation (3)}$$

where Q is the Jones matrix for a quarter-wave plate 16 or 18, W is that for a phase retarder 20 with a phase shift of φ and R is the Jones matrix for coordination transformation which converts one coordinate system to a new one with a rotated angle or the final rotation angle α. The symbol ψ is used to refer to the coordinate transformation, which is used for Jones matrix analysis. That is $$R(\psi) = \begin{pmatrix} \cos\psi & \sin\psi \\ -\sin\psi & \cos\psi \end{pmatrix} \quad \text{Equation (4)}$$

Therefore, we have $$R(45°) = \frac{1}{\sqrt{2}}\begin{pmatrix} 1 & 1 \\ -1 & 1 \end{pmatrix} \quad \text{Equation (5)}$$

and $$R(-45°) = \frac{1}{\sqrt{2}}\begin{pmatrix} 1 & -1 \\ 1 & 1 \end{pmatrix} \quad \text{Equation (6)}$$

The Jones matrices for the quarter-wave plates 16 and 18 and the phase retarder 20 are as follows:

$$Q\left(\frac{\pi}{2}\right) = \begin{pmatrix} e^{i\frac{\pi}{4}} & 0 \\ 0 & e^{-i\frac{\pi}{4}} \end{pmatrix} \quad \text{Equation (7)}$$

$$W(\phi) = \begin{pmatrix} e^{i\phi} & 0 \\ 0 & e^{-i\phi} \end{pmatrix} \quad \text{Equation (8)}$$

Therefore equation (3) becomes $$J = \begin{pmatrix} \cos\left(\frac{\phi}{2}\right) & -\sin\left(\frac{\phi}{2}\right) \\ \sin\left(\frac{\phi}{2}\right) & \cos\left(\frac{\phi}{2}\right) \end{pmatrix} = \text{Rot}\left(\frac{\phi}{2}\right) \quad (9)$$

where $$\text{Rot}\left(\frac{\phi}{2}\right)$$

is the rotation matrix, which rotates an incident light $E^i$ 22 to the output light $E^o$ 46 by an angle $$\alpha = \frac{\phi}{2}.$$

Referring to FIG. 2A is an embodiment of a negative rotator 10 with desired angle of rotation −α. The first and second quarterwave plates 16 and 18 are aligned −45° and +45° with respect to a horizontal line (not shown). The PLZT variable phase retarder 20 is sandwiched in between with.

Referring to FIGS. 1B and 2B, the first and second quarterwave plate 16 and 18 alignment configurations are in parallel. The parallel quarterwave plate alignment with a −45° or +45° degree orientation to the horizontal line (not shown) provides either positive (FIG. 1B) or negative rotation (FIG. 2B).

Incorporating the retarder 20 of FIG. 4, into the rotator 10 of FIGS. 1–2 provides an arrayable structure that is very flexible for different configurations. If multiple variable phase retarders have the same length (l) and width (w), they can be easily stacked together and sandwiched between the first and second quarterwave plates 16 and 18 as a rotator assembly suitable for parallel arrayed integration in a multi-channel device. The resultant rotator assembly will have a response time of less than about 0.5 ms.

It should be noted that a rotator device such as rotator 10 in FIGS. 1–2 can be used as an individual optical component in a variety of applications. For instance, a rotator device 10 can be used to adjust an optical signal in a PM (Polarization Maintaining) fiber. A first PM fiber can be positioned to direct an optical signal through a rotator device 10 for adjusting characteristics of the optical signal transmitted to a second PM fiber positioned to receive an output signal of the rotator. Accordingly, a voltage applied to corresponding electrodes of the rotator device 10 can adjust optical properties of a passing optical signal as previously discussed.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An electrically controllable azimuth optical rotator comprising:

a first quarterwave plate for receiving a first beam of electromagnetic energy having a first arbitrary polarization state, and outputting a second beam in response thereto;

an electric voltage controlled ferro-electric variable phase retarder at approximately 45 degrees to the first quarterwave plate for receiving the second beam and providing a third beam in response thereto, the electric voltage controlled ferro-electric variable phase retarder characterized by a phase shift of $2\alpha$, where $\alpha$ is a desired angle of rotation of the first arbitrary polarization state; and a second quarterwave plate aligned either parallel or perpendicular to the first quarterwave plate far receiving the third beam and outputting a fourth beam in response thereto, the fourth beam having a polarization state similar to the first arbitrary polarization state but rotated by $\alpha$:

wherein the electric voltage controlled ferro-electric variable phase retarder comprises a plate of transparent polycrystalline PLZT material of a width about (w) 1.44 mm, a length (l) about 1.7 to 2.9 mm. and a height (h) about 500 μm. the plate having an optical axis oriented perpendicular to a propagation direction of radiation at a wavelength between 1200 nm and 1600 nm incident upon the plate that has a first polarization state, the plate having electrodes for applying an adjustable electric field between 0 volts and 400 volts across a plane of the plate perpendicular to the propagation direction to provide the phase shift at greater than $2\pi$ such that the polarization of light beam transmitted through the plate is transformed from the first polarization state to a second polarization state having the desired angle of rotation between 0 degrees and 180 degrees.

2. The rotator of claim 1, wherein the desired angle of rotation corresponds to half of the phase shift applied to the electric voltage controlled ferro-electric variable phase retarder.

3. The rotator of claim 1, wherein the first and second quarterwave plates are aligned 90 degrees to each other and each of the first and second quarterwave plates are aligned 45 degrees relative to the electric voltage controlled ferro-electric variable phase retarder sandwiched in between.

4. The rotator of claim 1, wherein the first and second quarterwave plates are aligned 0 degrees to each other and each of the first and second quarterwave plates are aligned 45 degrees relative to the ferro-electric retarder sandwiched in between.

5. The rotator of claim 1, wherein the electric voltage controlled ferro-electric variable phase retarder has a metal electrode structure for applying an electric field of the electric voltage controlled ferro-electric variable phase retarder that is perpendicular to the second beam.

6. The rotator of claim 1, wherein the electric voltage controlled ferro-electric variable phase retarder comprises a ceramic tunable waveplate.

7. The rotator of claim 1, wherein the electric voltage controlled ferro-electric variable phase retarder comprises a PZN-PT tunable waveplate.

8. The rotator of claim 1, wherein the electric voltage controlled ferro-electric variable phase retarder and the first and second quarterwave plates all have the same length (l) and width (W) for stacking together as a rotator assembly suitable for parallel arrayed integration in a multi-channel device.

9. The rotator of claim 8, wherein the rotator assembly has a response time of less than about 0.5 ms.

10. The rotator of claim 1, wherein the response time of adjusting the applied adjustable electric field from 0 volts to about 400 volts for providing the rotation angle from 0 degrees to about 180 degrees is less than about 0.5 ma.

11. The rotator of claim 1, wherein the electric voltage controlled ferro-electric variable phase retarder comprises a plate of transparent polycrystalline PMN-PT material of a width about 1.44 mm, and a height (h) about 500 pin, the plate having an optical axis oriented perpendicular to a propagation direction of radiation at a wavelength between 1200 nm and 1600 nm incident upon the plate that has a first polarization state, the plate having electrodes for applying an adjustable electric field between 0 volts and 400 volts across a plane of the plate perpendicular to the propagation direction to provide the phase shift at greater than $4\pi$ such that the polarization of radiation transmitted through the plate is transformed from the first polarization state to a second polarization state having the rotation angle between 0 degrees and 360 degrees.

12. The rotator of claim 1, wherein the electric voltage controlled ferro-electric variable phase retarder comprises a plate of transparent polycrystalline PZN-PT material.

13. The rotator of claim 1, wherein the electric voltage controlled ferro-electric variable phase retarder comprises a solid-state electro-optic retarder selected from a class of ferroeleotric complex oxide materials characterized by having a substantially gradual Curie temperature of less than about 490° C.

14. The rotator of claim 1, wherein the electric voltage controlled ferro-electric variable phase retarder comprises a 9.5/65/35 PLZT hot-pressed bulk ceramic having a width of about 1.44 mm.

15. The rotator of claim 1, wherein the electric voltage controlled ferro-electric variable phase retarder has a metal electrode structure of gold, titanium, and nickel (Au/Ti/Ni) for applying an electric field of the electric voltage controlled ferro-electric variable phase retarder that is perpendicular to the second beam.

16. The rotator of claim 15, wherein a voltage of less than 400 volts can be applied across the metal electrode structure of the electric voltage controlled ferro-electric variable phase retarder for providing the phase shift up to $2\pi$.

17. An electrically controllable azimuth optical positive rotator comprising:
   a first quarterwave plate at approximately 45 degrees for receiving a first light beam having a first arbitrary polarization state, and outputting a second beam in response thereto;
   an electric voltage controlled ferro-electric variable phase retarder at approximately 0 degrees for receiving the second beam and providing a third beam in response thereto, the variable phase retarder characterized by a phase shift of $2\alpha$, where a is a desired angle of rotation of the first arbitrary polarization state, wherein the electric voltage controlled ferro-electric variable phase retarder comprises a 9.5/65/35 PLZT hot-pressed bulk ceramic having a width of about 1.44 mm; and
   a second quarterwave plate at approximately $-45$ degrees for receiving the third beam and outputting a fourth beam in response thereto, the fourth beam having a polarization state similar to the first arbitrary polarization state but rotated by $\alpha$.

18. An electrically controllable azimuth optical negative rotator comprising:
   a first quarterwave plate at approximately $-45$ degrees for receiving a first beam of electromagnetic energy having a first arbitrary polarization state, and outputting a second beam in response thereto;
   an electric voltage controlled ferro-electric variable phase retarder at approximately 0 degrees for receiving the second beam and providing a third beam in response thereto, the variable phase retarder characterized by a phase shift of $2\alpha$, where $-\alpha$ is a desired angle of rotation of the first arbitrary polarization state, wherein the electric voltage controlled ferro-electric variable phase retarder comprises a 9.5/65/35 PLZT hot-pressed bulk ceramic having a width of about 1.44 mm; and
   a second quarterwave plate at approximately $-45$ degrees for receiving the third beam and outputting a fourth beam in response thereto, the fourth beam having a polarization state similar to the first arbitrary polarization state but rotated by $\alpha$.

19. An electrically controllable azimuth optical positive rotator comprising:
   a first quarterwave plate at approximately $-45$ degrees for receiving a first beam of electromagnetic energy having a first arbitrary polarization state, and outputting a second beam in response thereto;
   an electric voltage controlled ferro-electric variable phase retarder at approximately 0 degrees for receiving the second beam and providing a third beam in response thereto, the variable phase waveplate retarder characterized by a phase shift of $2\alpha$, where $-\alpha$ is a desired angle of rotation of the first arbitrary polarization state, wherein the electric voltage controlled ferro-clectric variable phase retarder comprises a 9.5/65/35 PLZT hot-pressed bulk ceramic having a width of about 1.44 mm; and
   a second quarterwave plate at approximately $-45$ degrees for receiving the third beam and outputting a fourth beam in response thereto, the fourth beam having a polarization state similar to the first arbitrary polarization state but rotated by $-\alpha$.

20. An electrically controllable azimuth optical negative rotator comprising:
   a first quartet-wave plate at approximately 45 degrees for receiving a first beam of electromagnetic energy having a first arbitrary polarization state, and outputting a second beam in response thereto;
   an electric voltage controlled ferro-electric variable phase retarder at approximately 0 degrees for receiving the second beam and providing a third beam in response thereto, the variable phase waveplate retarder characterized by a phase shift of $2\alpha$, where $-\alpha$ is a desired angle of rotation of the first arbitrary polarization state, wherein the electric voltage controlled ferro-electric variable phase retarder comprises a 9.5/65/35 PLZT hot-pressed balk ceramic having a width of about 1.44 mm and
   a second quarterwave plate at approximately 45 degrees for receiving the third beam and outputting a fourth beam in response thereto, the fourth beam having a polarization state similar to the first arbitrary polarization state but rotated by $-\alpha$.

* * * * *